United States Patent [19]
Barber, Jr.

[11] 3,980,071
[45] Sept. 14, 1976

[54] SOLAR ENERGY COLLECTOR

[75] Inventor: Everett M. Barber, Jr., Madison, Conn.

[73] Assignee: Sunworks, Inc., Guilford, Conn.

[22] Filed: Mar. 21, 1974

[21] Appl. No.: 453,353

[52] U.S. Cl................................. 126/271; 237/1 A
[51] Int. Cl.²........................................... F24J 3/02
[58] Field of Search ............. 126/270, 271; 237/1 A

[56] References Cited
UNITED STATES PATENTS

| | | | |
|---|---|---|---|
| 2,030,350 | 2/1936 | Bremser | 126/271 |
| 2,311,579 | 2/1943 | Scott | 126/271 |
| 2,693,939 | 11/1954 | Marchant | 126/271 X |
| 2,705,948 | 4/1955 | Rostock | 126/271 |
| 2,969,788 | 1/1961 | Newton | 126/271 |
| 3,236,294 | 2/1966 | Thomason | 237/1 A X |
| 3,254,643 | 6/1966 | Thomason | 126/271 |
| 3,299,881 | 1/1967 | Koch | 126/271 |

FOREIGN PATENTS OR APPLICATIONS

| | | | |
|---|---|---|---|
| 282,024 | 7/1952 | Switzerland | 126/271 |

*Primary Examiner*—Kenneth W. Sprague
*Assistant Examiner*—James C. Yeung
*Attorney, Agent, or Firm*—DeLio and Montgomery

[57] ABSTRACT

A solar heat energy collecting device and system embodying the same is disclosed where the devices are used in multiple to provide the required heating capacity, and where each device includes a housing member supportable on a roof between adjacent joists or on a separate structure. A solar energy collector plate is mounted within the housing, and heat transfer tubes are in intimate contact with the collector. A plurality of devices may be mounted in a columnar and row array with the tubes of each connected.

18 Claims, 18 Drawing Figures

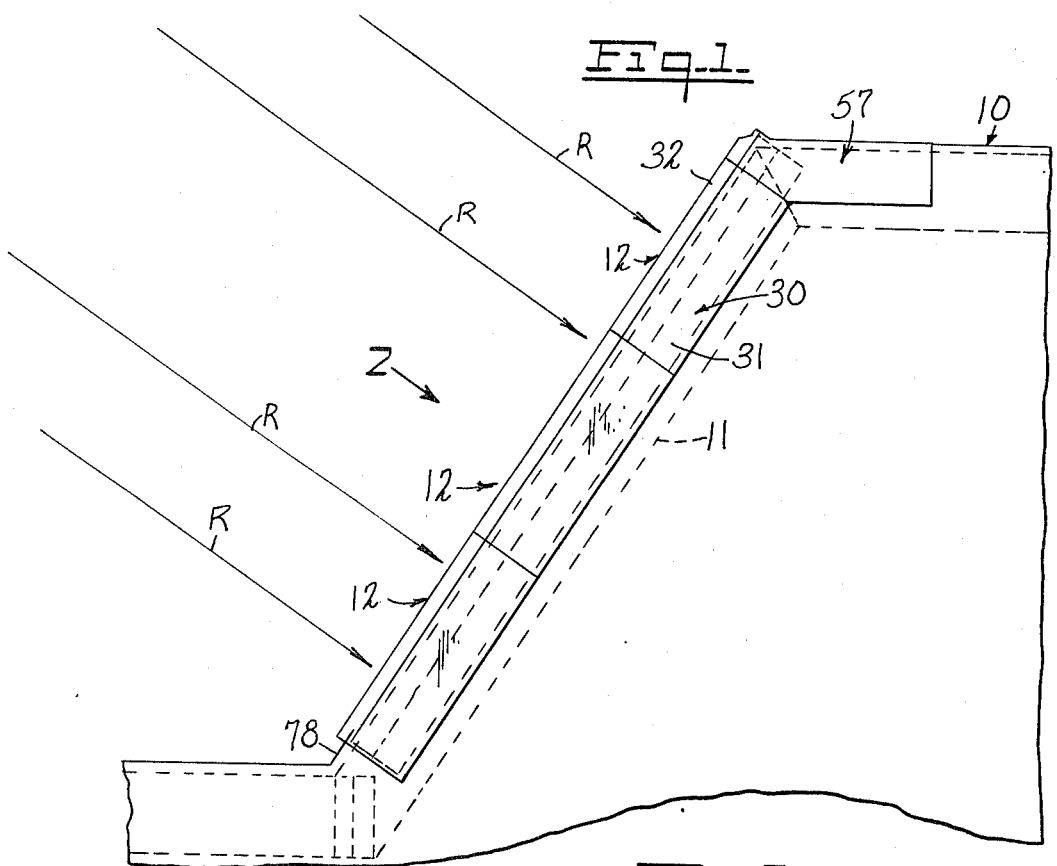
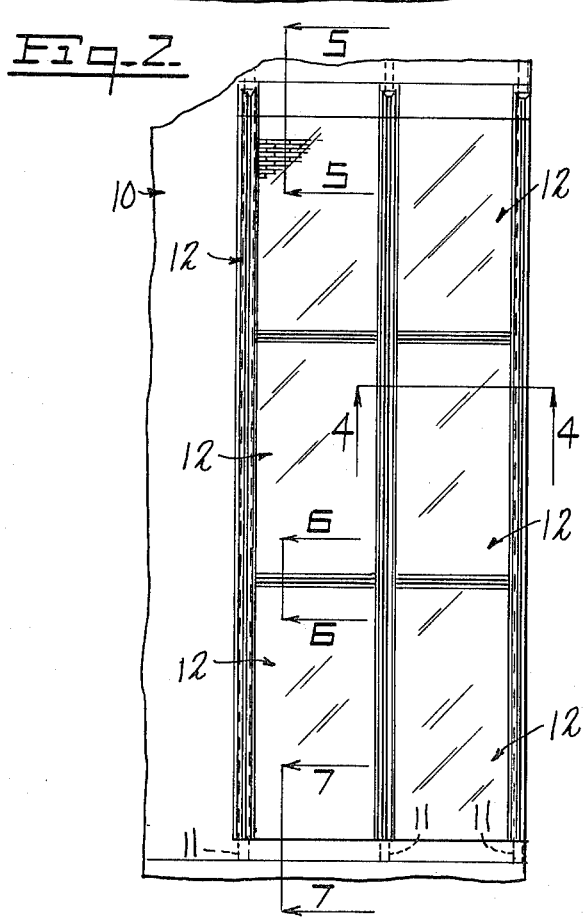
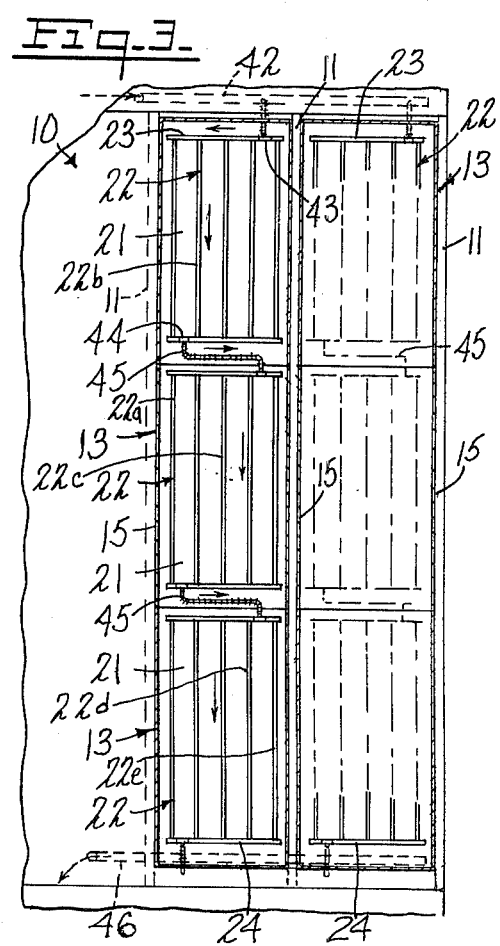

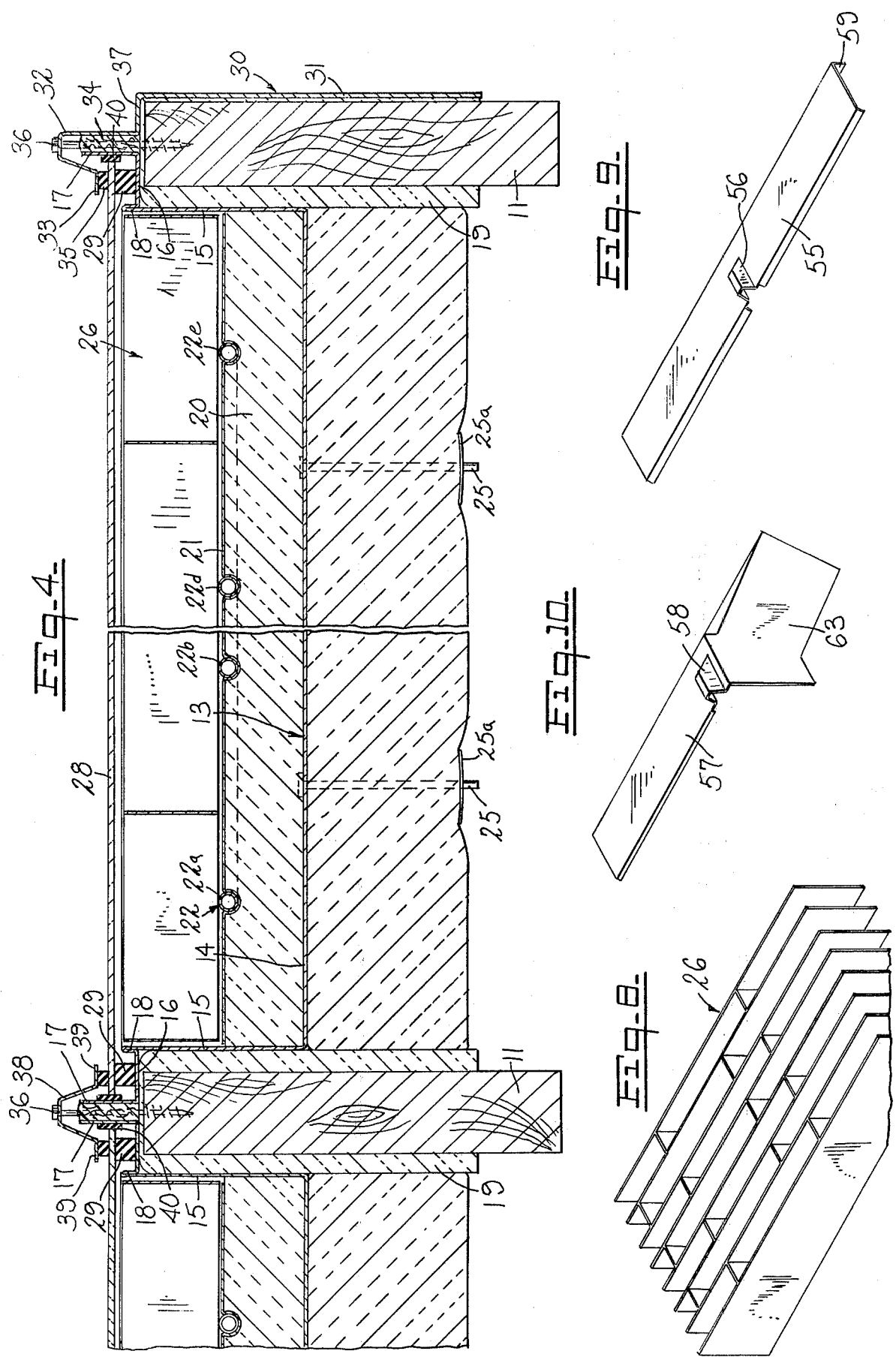

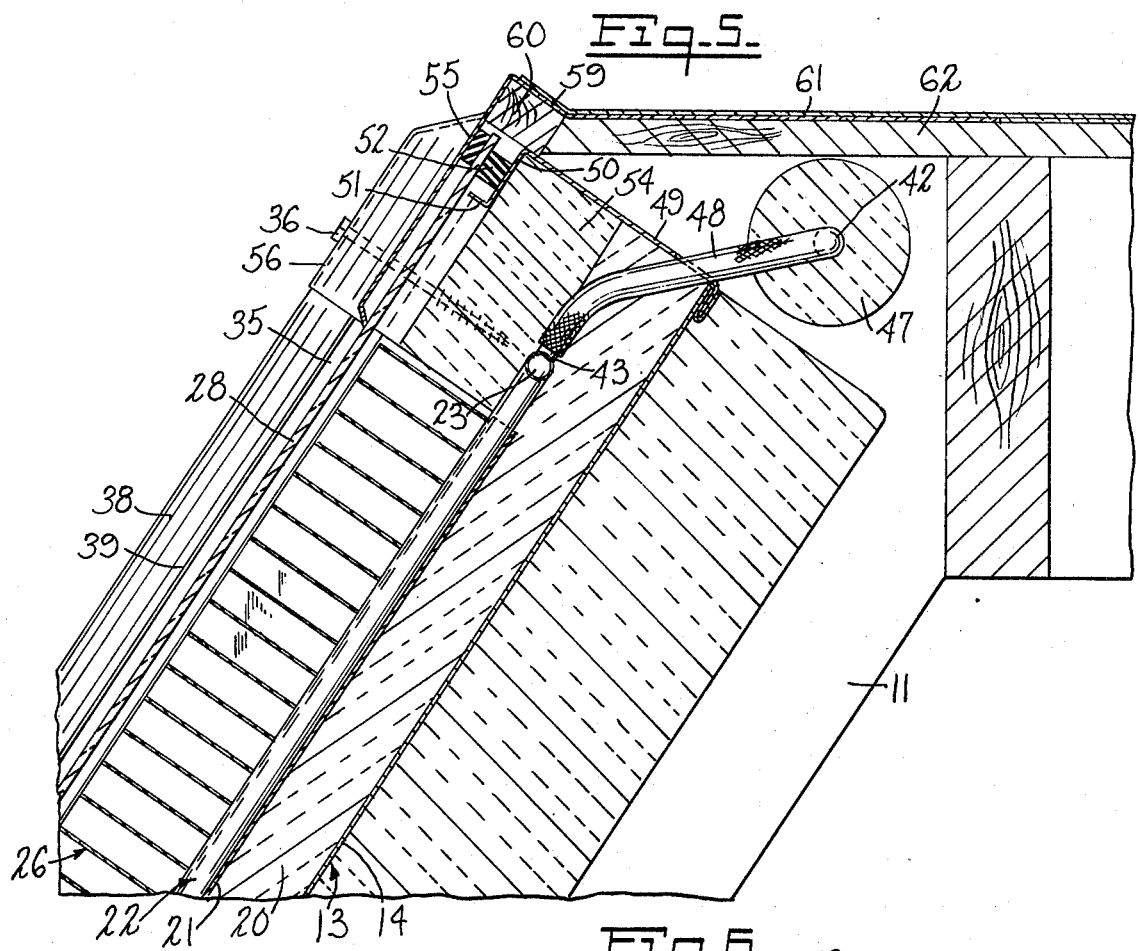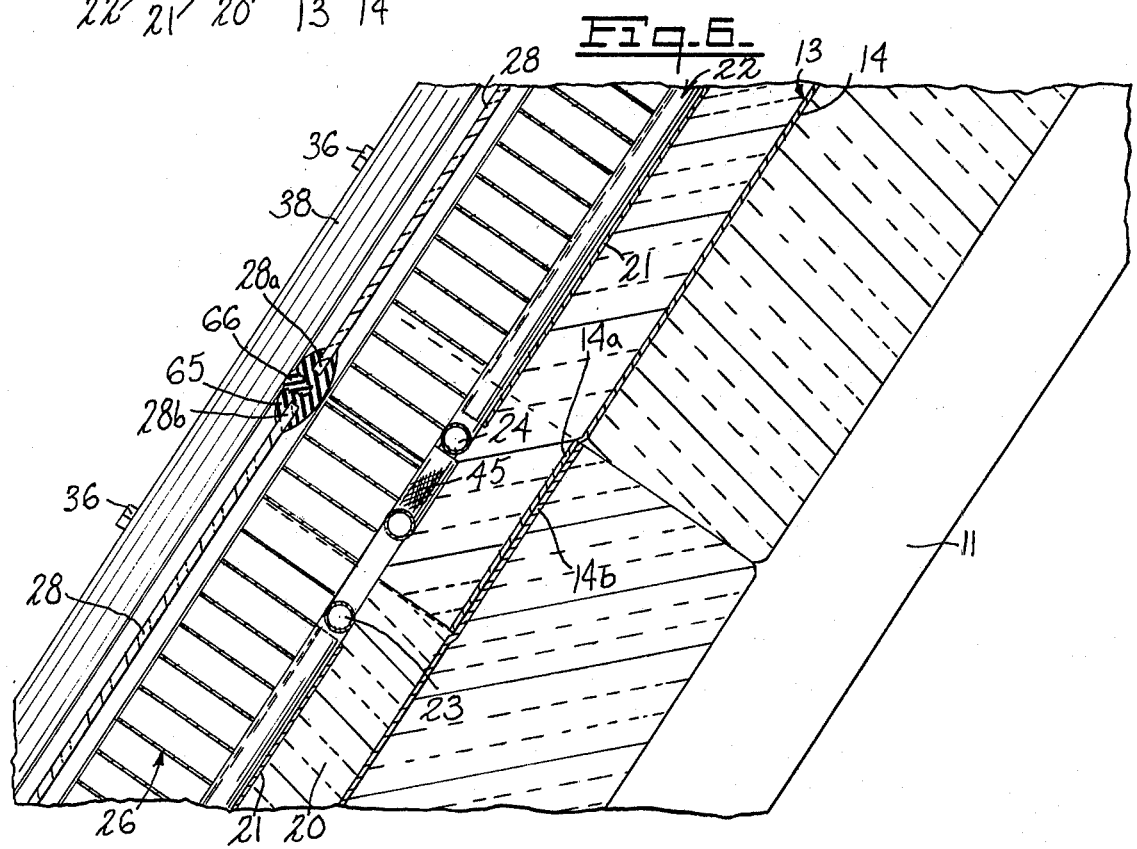

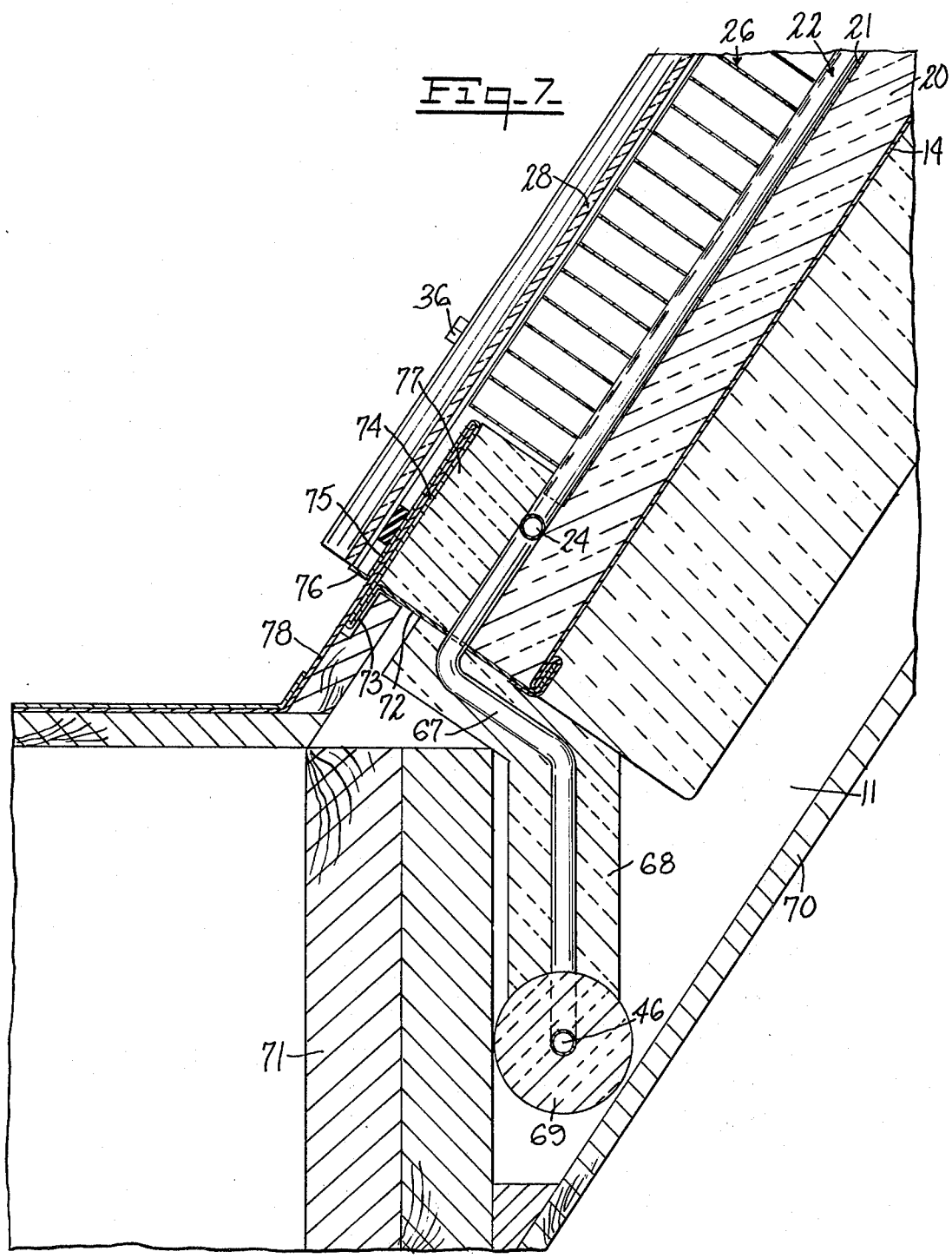

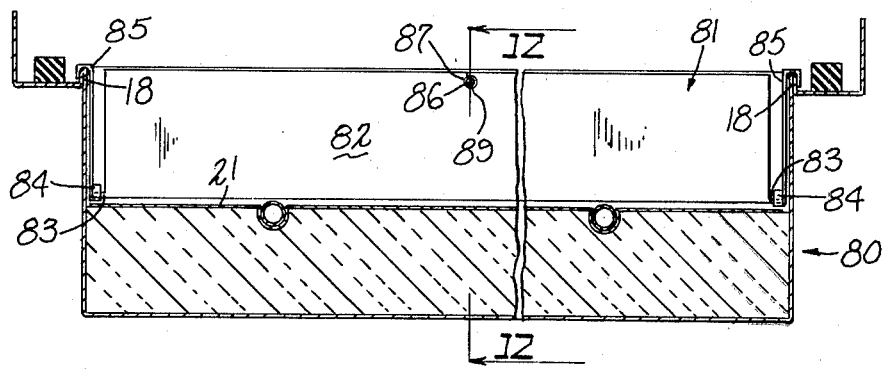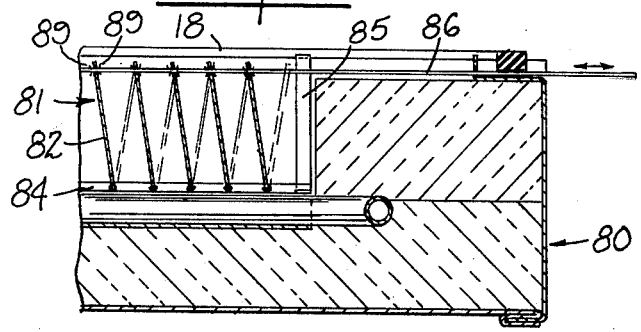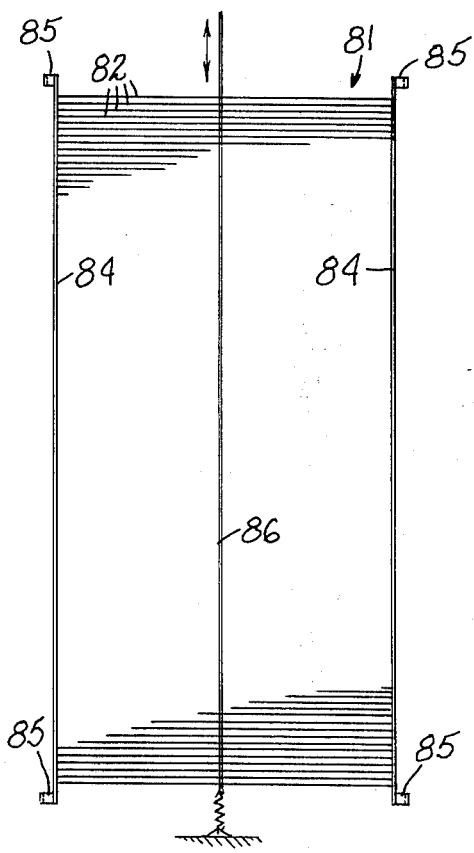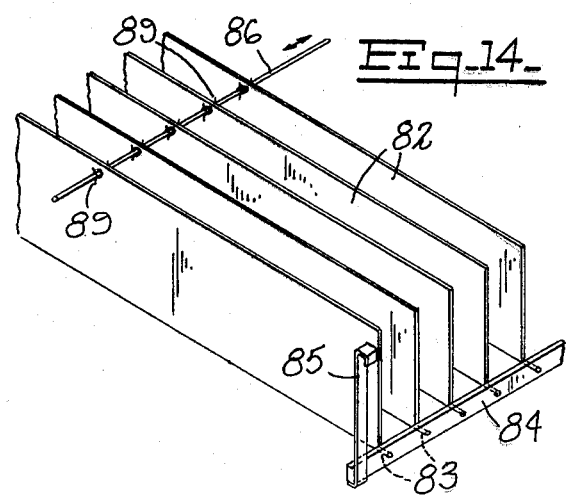

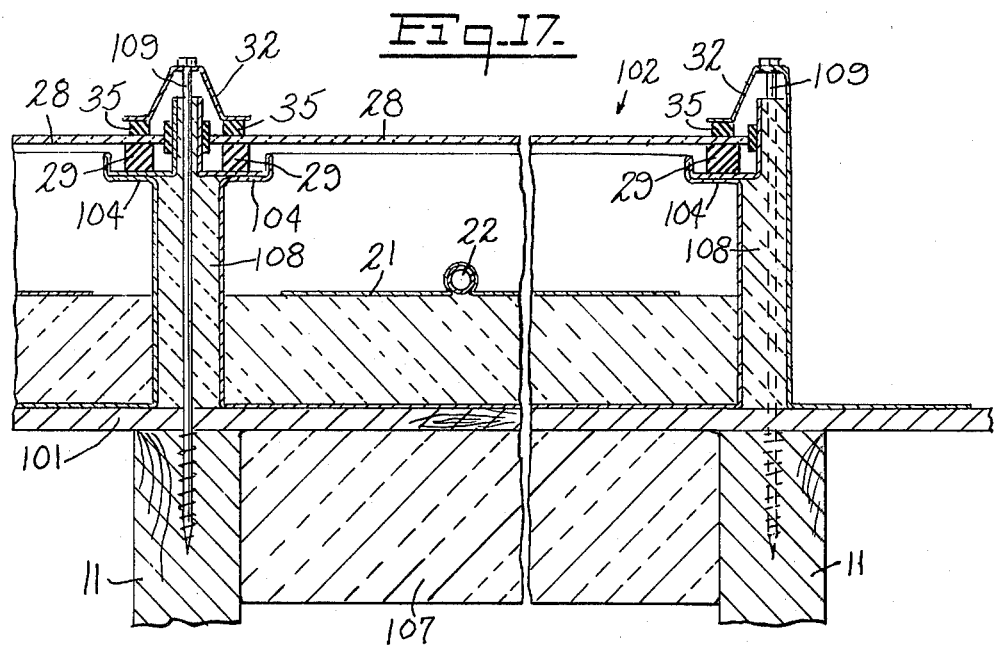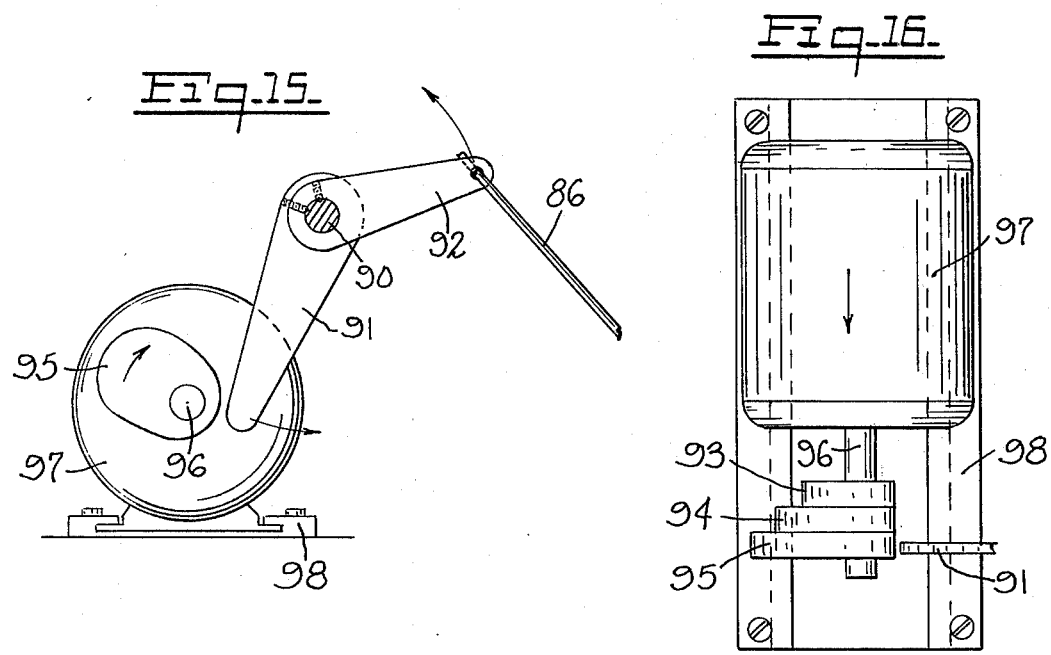

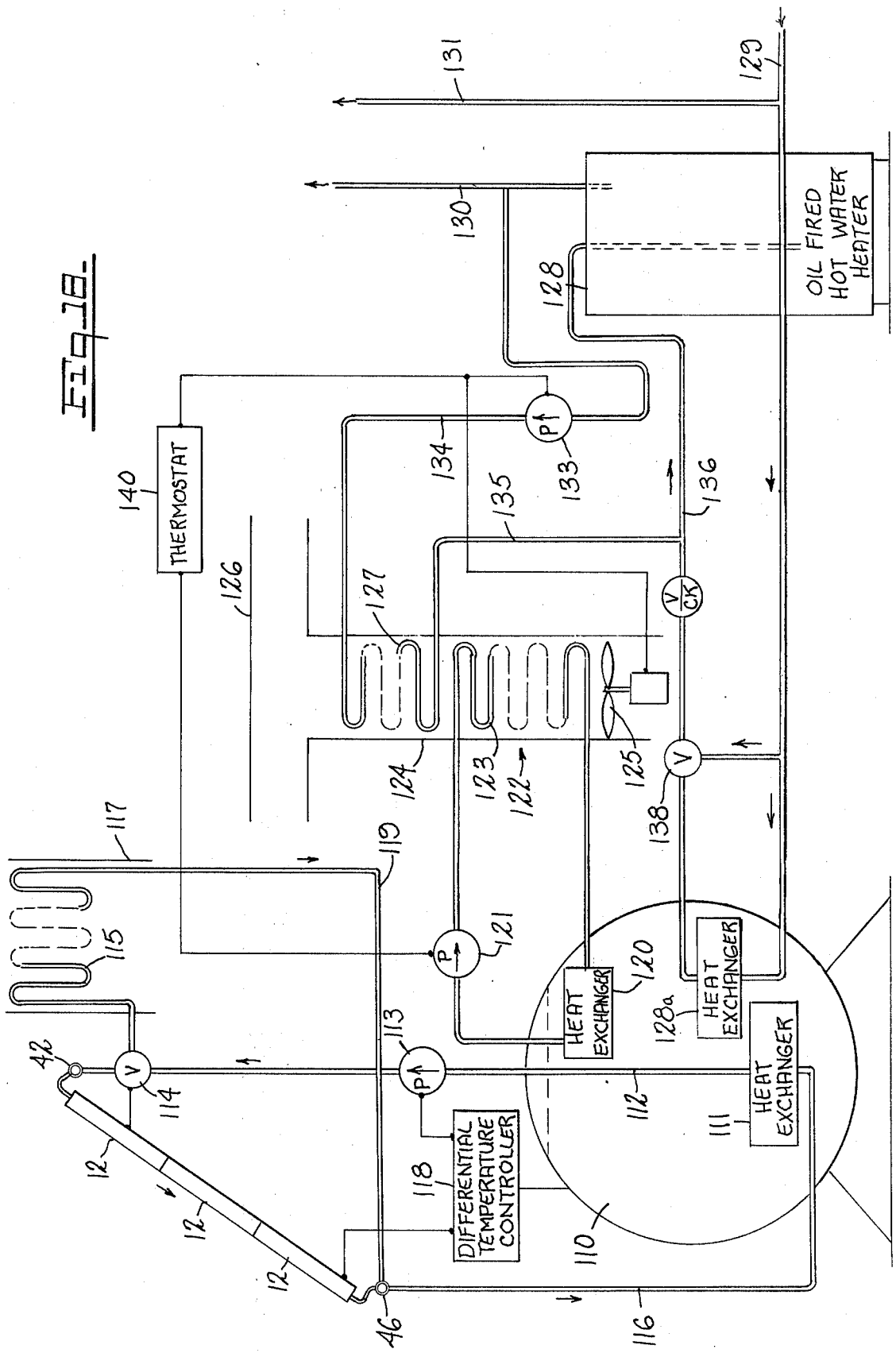

SOLAR ENERGY COLLECTOR

This invention relates to solar energy collectors.

The utilization of solar radiation to provide heat for a structure has long been proposed and has been utilized in some instances. Basically, solar heating systems utilize a radiation collector disposed to absorb heat from solar radiation, and a heat transfer medium in contact therewith which is moved in heat transfer relation with respect to the collector. The transfer medium is utilized either for heating directly, or in another heat transfer arrangement where the transferred heat is then conducted for heating purposes.

Solar heating systems have not yet found wide-spread utilization primarily due to the lack of efficiency, which thus requires greater surfaces to collect solar radiation, with resulting increase in original investment. Moreover, custom design and installation has been required in most uses of heating by solar energy.

Accordingly, the present invention provides new and improved solar heating collectors of increased efficiency which may be constructed in module form to facilitate installation and decrease expense. Solar heating collectors embodying the invention are more economical from the standpoint of initial cost and may be more easily installed in multiple. Moreover, solar heating modules embodying the invention may be utilized, easily assembled in multiple and in a number dependent upon the volume of the structure to be heated. The modules require no custom installation. The invention further provides a new and improved system utilizing the modules.

Briefly stated, the invention in one form thereof comprises a module which comprises a housing member, a collector plate member having a selective surface adapted to absorb solar radiation, and a plurality of liquid heat exchange tubes in intimate heat relationship contact with the collector plate. The housing members in one form also include support portions adapted to be supported on spaced apart joists of the structure. The modules are further so constructed that they may be arranged in adjacent or telescopic columnar relationship and the conductors of one module connected to the other. Another feature of the invention is the provision of convection retarding means which may be arranged over the collector in changing angles to allow the solar energy to strike a collector surface without reflection.

An object of this invention is to provide new and improved solar heat collectors in module form which may easily be installed and connected in multiple to provide sufficient solar energy collectors for a given structure design.

Another object of this invention is to provide new and improved means for use in a solar collector which minimizes or essentially eliminates heat loss due to convection, without hindering collecting efficiency.

A further object of this invention is to provide new and improved solar collectors which may be installed with ease either between joists of a structure, on roof sheathing or mounted to a separate structure thereon, and easily sealed against the elements and convective losses.

The features of the invention which are believed to be novel are particularly set forth and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a side elevation of a structure to which a radiant heating system embodying the invention is applied;

FIG. 2 is a view looking in the direction of arrow 2 of FIG. 1;

FIG. 3 is a view similar to FIG. 2 with the protective panels removed;

FIG. 4 is a sectional view seen in the plane of lines 5—5 of FIG. 2;

FIG. 5 is a sectional view seen in the plane of lines 5—5 of FIG. 2;

FIG. 6 is a sectional view seen in the plane of lines 6—6 of FIG. 2;

FIG. 7 is a sectional view seen in the plane of lines 7—7 of FIG. 2;

FIG. 8 is a perspective view of convection retarders which may be utilized in the invention;

FIGS. 9 and 10 are perspective views of elements used in conjunction with the invention;

FIG. 11 is a sectional view of an embodiment of the invention having adjustable radiation directing elements;

FIG. 12 is a view seen in the plane of lines 12—12 of FIG. 11;

FIG. 13 is a top plan view of solar energy directing elements of FIGS. 11 and 12;

FIG. 14 is a perspective view of a portion of FIG. 13;

FIGS. 15 and 16 are views of mechanism for adjusting the radiation directing elements of the embodiment of FIG. 11.

FIG. 17 is a cross-section view of another solar energy collecting module embodying the invention; and FIG. 18 is a schematic diagram of a system utilizing the invention.

A structure 10, such as a portion of a house as exemplified in FIG. 1 includes spaced apart rafters or joists 11. The joists 11 may be the roof or wall joists or rafters on a conventional structure. Spaced between the adjacent joists are a plurality of solar heat collector modules 12. FIG. 2 exemplifies six such modules arranged in adjacent columns of three between three successive rafters. Each of the modules contains a collector plate hereinafter described, adapted to absorb solar heat energy represented by the arrows R. Each of the modules as shown in section in FIG. 4 includes a housing member 13 having a bottom pan portion 14, upstanding side wall members 15, extending into a flange 16 and an upright end portion 17. The housing may be so formed that an upstanding small rib 18 is defined as wall 15 and flange 16. As shown, flanges 16 suport the housing 13 between adjacent joists 11 and rest on a piece of flexible or compressible insulating material. A piece of flexible insulation 19 is laid over a joist with the ends extending downwardly to provide insulation between the joists and the housing 14. Disposed within housing 14 along the bottom thereof is insulating material 20 such as a section of rigid fiber glass. Diposed above insulation 20 is a solar collector plate 21 which has a coating hereinafter described which will be referred to as a selective surface. Each collector includes a tubular heat exchanger 22 (FIG. 3). Disposed in intimate heat contact relation with plate 21 are a plurality of heat exchange tubes 22a, 22b, 22c, 22d, and 22e which extend in substantially parallel spaced apart relationship between headers 23 and 24. As shown, plate 21 is formed with troughs or wells which receive the heat exchange tubes and headers and it will be understood that the tubes may be either downwardly or upwardly disposed with respect to the collector plate. If desired, additional insulating material may be affixed to the underside of housing 13 as by means of studs 25 and large lock washers 25a. Alternatively, the housing may be deepened in the vertical dimension to accept a greater dimension of insulating material. Included within housing 14 and supported from the upper rib portions 18 is an assembly 26 which is adapted to retard convection currents over the collector plates. As shown, the assembly 26 is a honeycomb arrangement and is made of reflective material such as aluminum foil or thin sheet material. Moreover, the edges of plate 21 stop short on contact with side wall members 15.

The plate 21 is preferably of copper or other heat conductive metal and preferably has thereon a so-called selective surface which is designed to permit the absorption of solar radiation by the copper plate and decrease thermal radiation from the plate. The assembly 26 serves the function of inhibiting convective currents of air within the housing above collector plate 21. The assembly 26 is also spaced a small distance, perhaps ⅛ to ¼ of an inch, above the surface of 21 so that it will not conduct heat from plate 21 and act as a radiator.

A transparent cover member 28 is supported above plate 21 and in short spaced relation from assembly 26. Member 28 has its side edges supported on the joists 11 through the flanges 16 and rests on gaskets or seal 29. A border or frame of aluminum extrusion (not shown) may be provided on each cover member 28 for ease of handling and installation. On one side of the joists there is no additional module. On this side (the right side as viewed in FIG. 4) a sealing and flashing member 30 is utilized to seal the collector from the elements. Member 30 may be made of various lengths. It has a flat side portion 31 tightly fitted against the joist 1. Side portion 31 extends into an upright cap portion 32 and a lower flange 33. Disposed between cap portion 32 and upright portion 17 of side wall members is a length of gasketing material 34. A further sealing member 35 is disposed between flange 33 of member 30 and cover member 28. Member 30 receives a plurality of lag bolts 36 which extend through cap portion 32 and gasketing material 34 into joist 11. As the bolts 36 are set, the seals 29 and 35 are compressed to effect a completely watertight assembly.

A conventional piece of sheathing material such as plywood (not shown) may be extended from the top of the joist and shoulder 37 of member 30 to provide the foundation for conventional roof covering if the roof has extended beyond. Conventional flashing may be utilized at this joint.

Where modules are mounted on opposite sides of a joist 11 the construction is as shown on the lefthand portion of FIG. 4. A sealing cap member 38 having flanges 39 is provided to span across the seals 35 of the adjacent modules. Additional seals 40 may be provided between each end of cover member 28 and the side wall members.

In some instances, it may be preferable to border the edges of the cover members in a border for ease of handling. An extruded aluminum mullion may be used and seated directly on flanges 16 behind ribs 18, or seated on the gaskets 29. This construction is prefered where the units are mounted above the joists, or on separate structures.

The upper and lower seals for a column of modules will hereinafter be described. An assembly of six modules in two columns between three successive joists is exemplified in FIG. 2. FIG. 3 shows the same modules with the cover and seals removed. The heat exchange tubes 22a – 22e of each module extend substantially parallel between end headers 23 and 24. The heat exchangers 22 are preferably of copper for greatest heat exchange efficiency. As shown, the end headers 23 of the uppermost modules are connected to a manifold 42 and the lower headers 24 are connected to the upper header of the next lower module. The headers 23 and 24 are provided with T-connectors or stubs 43 and 44 between which is led a flexible or bendable tubing connector 45 to provide connection between adjacent heat exchangers. The lower header 44 of the last heat exchanger in a column is connected to a return manifold 46.

Reference is now made to FIG. 5. The manifold 42 is preferably encased in a sleeve of insulating material 47. A lead-in 48 is connected to upper header 23. Housing member 13 includes removable end walls 49. However, the end walls will not be removed from the upper and lower modules of a column. End wall 49 has an inwardly directed flange 50 and an upstanding finger or lip 51. Resting on flange 50 is an elongated seal 52 which extends across cover member 28. Lip 51 extends between the rib-like members 18 and provides a dam for any moisture which might enter the upper module of a column. If such moisture did enter it would be caught by lip 51 and would then run down on the outside of ribs 18.

Insulation 54 is disposed between the joists above the upper module of a column. The upper module has connected thereto an upper sealing and flashing member 55 which has a trough 56 (FIG. 9) defined therein to overlay the cap member 37. In the case of an end piece 57 (FIG. 10) a trough 58 is defined therein to overlay portion 32 of member 30. Member 55 as shown in FIG. 9 has a rear extending flange 59 adapted to extend over a transverse structural member 60. Thereafter, conventional roofing material 61 may be placed over sheathing 62 on the roof of the structure. The member 57 is flashed out as indicated at 63 to provide a seal on the side of the structure.

It should be appreciated that if the module support structure was a conventional gable roof, the flange 59 could be extended outwardly and then overlaid as in conventional flashing with regular shingling material.

FIG. 6 exemplifies the manner in which modules between adjacent joists are joined to form a column. The end cover plates are removed and the bottom 14 of a housing 13 may be slightly offset as shown at 14a and 14b to provide a telescoping or overlapping structure. The same offsetting is made on the side wall members 15. At this point the insulation from the lower module may be slid partially into the upper module so as to leave no voids, and the flexible connecting tube 45 is connected between the headers 23 and 24 of the adjacent modules.

To minimize handling, it is preferred that each module be provided with its own cover member 28. For sealing purposes an elongated sealing member 65, preferably of neoprene extends across the horizontal upper and lower edges of adjacent covers 28 and has pockets to receive such edges therein. Key-like flexible inserts 66 are than inserted into members 65 so that the ends 28a and 28b are sealingly engaged. The seals 65 extend completely across the edges of the cover members to the sealing caps, and beneath the flanges 33 and/or 39. FIG. 7 shows the lower module of a column and the connection of a header 24 through a connecting conduit 67 to lower return manifold 46. The connector 67, as well as manifold 46, is encompassed in insulating sleeves 68 and 69, respectively. In FIG. 7 there is also shown the interior finished ceiling 70 of the structure as well as some of the uprights 71. The lower end piece 72 of a housing 13 is also removable, and is formed with an upright portion 73 extending into a lip 74 and backwardly to define a pocket 75 and then upwardly into an end piece 76. This member is removable from the sidewalls 15 in the same manner as described for upper end piece 49. Insulating material 77 is received under the pocket defining portion, and the sealing strips 38 terminate on the stop 76. A piece of flashing 78 extends upwardly into pocket 75 and downwardly a distance along the structure. Thereafter conventional roofing may be applied below the flashing 78 and below the columns of collector modules.

The construction thus far described enables a plurality of modules to be placed in columns, connected between parallel joists or other support members, and complete sealing against the weather and external convection currents which would tend to decrease the efficiency of the collectors is eliminated.

In some applications it may not be deemed necessary to utilize the solar reflector and director assembly 26. In such case the insulation 23 or a portion thereof may be included in housing 13 and the plate 21 mounted closer to the upper edges of the housing. If desired, a finished surface may be placed on the bottom of the insulation below the housing or the housing 13 to provide the interior finished surface of a structure, if the joists or beams are to be left exposed on the interior.

As thus far described it will be seen that each module contains a collector plate, heat exchanger tubes, insulating means, and a transparent cover plate. The directing assembly 26 is optional. The side sealing members and assembly will generally be of a length to extend along the length of several collector modules.

The tubes 22a – 22e are preferably uniformly spaced on plate 21 to maximize efficiency in the transfer of heat. A suitable liquid medium for use in the exchange tubes is ethylene glycol.

Reference is now made to FIGS. 11 – 14 which exemplify another embodiment of the invention which may be utilized to obtain even higher collection efficiency. A collector module 80 is the same as collector 12 except that the director assembly 26 has been replaced with an adjustable convection retarding assembly 81. The mechanism 81 comprises a plurality of louver-like member 82 having extensions 83. Extensions 83 act as pivot pins and extend into apertures in lower bar members 84 on either side of the assembly. Hangers 85 are provided at spaced apart points on the bars 84 to hang the assembly over the ribs 18. A shaft 86 extends through apertures 87 in each of the louvers 82 with a loose connection thereto to permit some motion therebetween. Small pins 89 or other similar devices are mounted to shaft 86 on either side of the apertures 87 of the louvers. The shaft 86 may be moved in either direction to change the angle of the louvers with respect to the plane of the collector plate 21.

In this arrangement the angle of the louvers may be varied depending upon the angle of elevation of the sun in the sky through the various seasons, so that the solar energy will be directly incident on plate 21 and substantially parallel to the louvers.

As shown, the louvers are spaced from the surface of plate 21 to eliminate any direct contact and possibly heat transfer from the surface to the louvers, as well as interrupt convection currents. The louvers or vanes may be slightly bowed or otherwise formed to increase the stiffness thereof, if made of very thin material.

As shown, the rods 86 of joined collectors may be connected so that the directors of all panel units of a column may be actuated simultaneously.

Means are further provided for varying the angle of the louvers as a function of time of day and the seasons of the year.

A shaft or rod 90 (FIG. 15) is pivotally mounted above the modules, and has a cam follower 91 thereon. Arms 92 on shaft 90 are connected to each of louver control rods 86. Cams 93, 94 and 95 are mounted to the shaft 96 of a timing motor 97. Motor 97 is slidably positionable on a mounting member 98.

As cams 93 – 95 rotate, a selected one will pivot shaft 90 through cam follower 91. Arms 92 move shafts 86 of each module and position the louvers 82 substantially parallel to the incident radiant energy. This prevents absorption of energy by the louvers and more efficient collection by the panels.

The cams 93, 94 and 95 are contoured and sized in accordance with the seasons, winter, spring, fall, and summer, respectively, to position the louvers in accordance with the elevation of the sum. The motor 97 together with its associated gearing, operates on a 24 hour cycle. Usually, the cycle is calibrated so that the louvers are perpendicular to the collector plate at night and then will be inclined to produce most efficient reflectivity during the day as the louvers follow the change in elevation of the sum.

The summer cam 95 will position the louvers at greater angles to the collector plate during the summer because of the higher elevation of the sun. The winter cam provides the least angular inclination with respect to the plates and the spring and fall cam positions the louvers intermediate the other cams. This discussion presupposes that the collector plates are positioned at an angle of 45° to 60° to the vertical. If the collector plates were vertically disposed, the camming arrangement would be different. The camming arrangement will depend on the relative angle of the collector plates to the horizontal.

The surfaces of the collector plates are treated so as to be selective. This is to increase the thermal efficiency as a collector. The selective surface causes the plate to be a good absorber of solar radiation which has a wave length on the order of 0.4 – 2.5 microns, and a poor emitter of thermal radiation which has a wave length on the order of 10 to 20 microns. Selective surfaces may be a mixture of zinc sulfide and nickel sulfide deposited by an electroplating operation. Also electroplated copper oxide or nickel oxide. Such selective coatings are described in Chapter 12 of *Direct Use of The Sun's Energy* by Farrington Daniels, Copyright 1964, Library of Congress catalog card number 64–20913.

The reflecting and directing means may take many forms. It may be rectangular honeycombs as shown in FIG. 8, or a multiplicity of small cylinders arranged as a honeycomb. The honeycombs cell should be chosen of a highly reflective, non-heat absorbing material, and out of physical contact with the collector plate. The overall size of the honeycombs both as to opening and depth is chosen such that there is only one reflection of solar energy before the collector plate. An example is a honeycomb of cylinders approximately one inch in diameter and one to two inches deep. If the cells become smaller in depth, the overall insulating effect of the honeycomb decreases.

FIG. 17 exemplifies an alternate embodiment of the invention wherein the collector modules are placed on roof sheathing 101 overlying joists 11. The modules 102 are similar to the modules previously described with the exception they are supported on roof sheathing rather than hung between the joists. Only the different features of construction will be described in FIG. 17. The housing member has sidewall means with inwardly directed flanges 104, which support seals or gaskets 29 upon which a transparent cover member 28, such as glass, rests. The cap members 38 are those as previously illustrated in FIG. 4 as are the upper seals 35. This construction generally has a lower profile and insulating material 107 is therefore disposed beneath the sheathing. Insulating material 108 is disposed between the housing wall members of adjacent modules and an elongated lag bolt 109 extends through the ceiling caps to the joists 11. However, the modules need not be dimensioned in accordance with the rafters, and may be fastened only to the sheathing. The collector plates 21 and heat exchanger tubes 22 are the same as previously described, as well as their method of connections. This construction generally of lesser depth dimension is shown in FIG. 4 to maintain a lower roof profile.

Cover members 28 preferably are cut to a size for each module, but may be made in varying lengths to cover several modules and eliminate the seals 65 therebetween.

FIG. 18 exemplifies a system embodying the invention. A large water storage tank 110 holds a large reservoir of water for heat exchange purposes. The solar heating piping system includes a heat exchanger 111 in tank 110, a line 112 from heat exchanger 111 leads through a pump 113 to a temperature responsive directional valve 114. Valve 114 will direct the heat exchange medium to either a heat dissipating coil 115 or to manifold 42. After passing through the collectors, the heat exchange medium enters manifold 46 and returns to heat exchanger 111 through line 116. Valve 114 is responsive to the temperature of the fluid. If the fluid temperature exceeds a predetermined value, for example 220°F, valve 114 directs the heat exchange medium through the heat rejection or dissipating coil. Coil 115 is preferably finned, not shown, and disposed in a belvedere 117 or at a vent. The heat in coil 115 may be used to provide a stack effect for building exhaust.

A differential temperature controller 118 senses the temperature of the collector plates and the water temperature in tank 110. Whenever the collector plate temperature exceeds the water temperature by a predetermined amount, for example 5°F, the controller turns on pump 113.

A second heat exchanger 120 is disposed within tank 110 and furnishes hot water or other heat exchange medium to a heating system. Water heated in heat exchanger 120 is conveyed by means of a pump or circulator 121 to a heating system which may comprise one or more fan-coil heating units 122. The units 122 include one or more heat exchange coils 123 disposed in a housing 124. A motor driven fan 125 may move air over the coils, as shown, or be positioned for drawing air over the coils. As fan 125 blows or draws air over coil 123, the heated air is conveyed via duct work 126, to various areas to be heated. Housing 124 contains a further air heating coil 127, connected to a standby and domestic hot water heater 128. Heater 128 may receive heated water from heat exchanger 128a in tank 110 and supplies domestic hot water through line 130. Domestic cold water is supplied over line 131. Water is supplied to heat exchanger 128a in tank 110 through supply line 129 from a well or other water source. Heated water is returned to tank 128 through a tempering valve 138 and line 136 which may mix cold water from line 129 to maintain the water in heater 128 at a predetermined temperature, for example 140°F.

Whenever the temperature of the water in tank 110 falls below the predetermined temperature, heater 128 commences to operate to heat the water in heater 128. Heater 128 will also supply hot water through pump 133 over line 134 to coil 127 for standby operation upon demand, as hereinafter described. A return line 135 from coil 127 leads to tank return line 136.

In operation during a usual heating period, the differential temperature controller 118 will sense that the collector temperature is higher than that of the water in tank 110. This will cause pump 113 to operate and the heat exchange medium will be conveyed through valve 114 and through the collectors. The heat exchange medium absorbs heat from the collectors and returns to heat exchanger 111 in tank 110 to heat the water therein. If for any reason the temperature of the collectors or the fluid exceeds a predetermined value as previously specified, pump 113 is turned off. Valve 114 will connect the collector coils to a dissipating coil 115. The fluid will then circulate from coil 115 through conduit 119 back through the collectors. This direction of fluid is due to the hotter less dense fluid in the collectors rising and the cooler more dense fluid falling after passing through coil 115. This will maintain the water in tank 110 in a predetermined temperature range suitable for heating. Alternatively, the pump 113 may be operated to direct fluid from heat exchanger 111 through coil 115. In such an arrangement, the conduit 119 would return to heat exchanger 111. When heating is called for, pump 121 will draw water from heat exchanger 120 through heating coil 123 and air blown over the coil 123 by fan 125 may be used for heating purposes. It will be understood that in some instances it may be preferable to use hot water baseboard heating or radiant floor heating rather than the fan coil unit disclosed.

A thermostat 140 is provided to control operation of pumps 121 and 133 when heat is called for. When thermostat 140 calls for heat for a given space, only pump 121 and fan 125 will initially operate. If the space temperature continues to fall, then pump 133 will also operate. Fan 125 will continue to operate in response to thermostat 140 calling for heat.

The system as disclosed is generally designed to provide a given percentage of the total heating requirements for a structure from solar energy. The domestic hot water heater is selected to be of a size to supply the design heat loss of a structure plus a given percent thereof for domestic water heating.

The system of FIG. 18 includes a first closed system for the solar heat exchange medium, and a second system for the heating water. The heat exchangers 111 and 120 within tank 110 may be of the conventional coil type or any suitable construction for the water in tank 110 to accept heat from exchanger 111 and give heat up to exchanger 120.

The heat exchanger 120 is optional. For greater efficiency, exchanger 120 may be eliminated, and the heated water in tank 110 may be pumped directly to units 122.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A solar heat collecting device, comprising a housing member having upstanding side wall members, a layer of insulating material in said housing extending between said side walls, a solar heat energy collecting member extending between but not contacting said side wall members above said insulating material, said plate being positioned below the upper edges of said side wall members, flanges extending inwardly of said housing from said side wall members below the upper extremities thereof, a transparent cover member supported at its edges on said flanges, inner sealing means disposed between said cover member and said flanges, outer sealing means on the upper edges of said cover member, and a cap member clamping said cover member to said flanges between said sealing means.

2. The device of claim 1 further comprising second flanges extending outwardly from said wall members to provide support for said housing member on spaced apart structural members, and support the device between the structural members.

3. The device of claim 1, further including an upper end wall member extending between said side wall members, said end wall member including an upwardly extending dam to block moisture from said collecting member, and upwardly extending gutters on said side wall members to direct moisture blocked by said dam along said gutters.

4. The device of claim 1 further comprising means between said side wall members and out of contact with said collecting member adapted to retard convection over said plate.

5. The device of claim 4 wherein said means between said side wall members comprises a plurality of spaced apart vane-like members having essentially parallel opposite surfaces, and means for varying the angle between said vane-like members and the surface of said plate.

6. The device of claim 5 wherein said means for varying varies the angle of said vanes as a function of the angle of elevation of the sun.

7. The device of claim 3 comprised of a plurality of housing members with the side walls in overlapping relationship, and a lower end wall of the lowermost housing, said gutters being continuous along said sidewalls.

8. A system comprising two devices of claim 1 with side walls in side-by-side relation, said cap member clamping the adjacent edges of the cover members of the two housings.

9. A solar heat collecting device, comprising a housing member having upstanding side wall members, an upper end wall member, a solar heat energy collecting means extending between but not contacting said side and end wall members, upwardly extending dam means on said upper end wall member to block moisture from said collecting means, upwardly extending gutters on said side wall members to direct moisture blocked by said dam along said side wall members, said dam extending between said gutters and a transparent cover member supported on said housing above said dam and gutters.

10. The device of claim 9 wherein said side wall members have inwardly directed flanges thereon providing supports for said cover members, and sealing means disposed on said flanges beneath said cover member.

11. The device of claim 9 wherein said housing has a lowr end wall, said device comprises a plurality of housing members with appropriate end walls removed and with side walls in overlapping relation, said gutters being continuous along said plurality of housing members.

12. The device of claim 9 wherein said collecting member is a plate-like member, and tubing means in intimate heat exchange relation with said plate, said tubing means arranged to conduct a liquid heat exchange medium.

13. The device of claim 9 further comprising means between said side wall members and out of contact with said plate adapted to retard convection over said plate.

14. The device of claim 13 wherein said means between said side wall members comprises a plurality of spaced apart vane-like members having substantially parallel opposite surfaces.

15. The device of claim 14 wherein said means for varying varies the angle of said vanes as a function of the angle of elevation of the sun.

16. The device of claim 11 wherein said cover comprises first and second cover members positioned edge-to-edge, and sealing means between said edges and extending to said side wall members.

17. The device of claim 12 wherein said housing has a lower end wall, said device comprises a plurality of housing members with appropriate end walls removed and with side walls in overlapping relationship, and means connecting the tubing means of each housing together.

18. A solar heat collecting device arranged to be supported on and between two spaced apart structural members, comprising a housing member having upstanding side wall members, a layer of insulating material in said housing extending between said side walls, a solar heat energy collecting member extending between but not contacting said side wall members above said insulating material, said member being positioned below the upper edges of said side wall members, flanges extending outwardly of said housing from said side wall members adjacent the upper extremities thereof, said flanges arranged to support said housing on the spaced apart structural members with the housing therebetween, a transparent cover member supported at its edges on said flanges, inner sealing means disposed between said cover member and said flanges, outer sealing means on the upper edges of said cover member, and a cap member clamping said cover member to said flanges between said sealing means.

* * * * *

UNITED STATES PATENT AND TRADEMARK OFFICE
CERTIFICATE OF CORRECTION

PATENT NO. : 3,980,071
DATED : September 14, 1976
INVENTOR(S) : Everett M. Barber, Jr.

It is certified that error appears in the above-identified patent and that said Letters Patent are hereby corrected as shown below:

Column 6, line 33, "sum" should read --sun--.

Column 6, line 39, "sum" should read --sun--.

Column 9, line 23, "is;" should read --is:--.

Column 10, claim 11, line 2 thereof, "lowr" should read --lower--

Column 9, line 30, change "plate" to --collecting member--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*